United States Patent
Lee

(10) Patent No.: US 6,807,132 B1
(45) Date of Patent: Oct. 19, 2004

(54) SERVO CONTROL METHOD USING INFORMATION OF A TABLE OF CONTENTS OF A DISK

(75) Inventor: Hyo Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 956 days.

(21) Appl. No.: 09/653,948

(22) Filed: Sep. 1, 2000

(30) Foreign Application Priority Data

Sep. 21, 1999 (KR) ........................................ 1999-40591

(51) Int. Cl.$^7$ .............................................. G11B 21/08
(52) U.S. Cl. ................................ 369/32.01; 369/30.15; 369/44.28
(58) Field of Search ........................... 369/32.01, 30.15, 369/30.12, 30.13, 30.14, 30.11, 44.28, 47.1, 47.16, 47.3, 53.24, 44.29, 44.34, 44.35

(56) References Cited

U.S. PATENT DOCUMENTS

| | | | | |
|---|---|---|---|---|
| 5,315,568 A | * | 5/1994 | Dente et al. | 369/30.12 |
| 5,661,848 A | * | 8/1997 | Bonke et al. | 711/112 |
| 5,734,635 A | * | 3/1998 | Min | 369/44.28 |
| 6,600,699 B2 | * | 7/2003 | Miyazaki | 369/30.15 |
| 6,603,718 B1 | * | 8/2003 | Ozawa | 369/47.1 |

* cited by examiner

Primary Examiner—Ali Neyzari
(74) Attorney, Agent, or Firm—Birch, Stewart, Kolasch & Birch, LLP

(57) ABSTRACT

The present invention relates to a method for servo-controlling when a reproduction is requested to a multi-session disk for non-real-time data or real-time data of audio or video stream. This servo-control method using the information of table of contents reads information of a table of contents written in a disk when a data-requesting command is received from a connected host; distinguishes the type of data recorded in a target location based on the read information of the table of contents; checks whether the distinguished type is corresponding to the command type; and re-sets or maintains current parameters for servo-control operation if the distinguished type is matched to the received command, so that a servo-control mechanism is adjusted to the type of the requested data before a pickup starts to move to the target location. Therefore, this servo-control method using the information of table of contents enables a servo-control operation to be adjusted stably based on the type of data to be reproduced, and makes a quick response to a host without conducting any servo-control operation when a type-mismatched command is received. In addition, although a data block preceding target data blocks has a damaged sub-Q channel data, the present method can reproduce the target data because it does not access the preceding data block.

8 Claims, 6 Drawing Sheets

Conventional Art

FIG. 2

| Command Description | Operand Code | Mandatory/Optional |
|---|---|---|
| ⋮ | ⋮ | ⋮ |
| Play Audio (10) | 45h | O* |
| Play Audio MSF | 47h | O* |
| Play CD | BCh | O |
| Prevent / Allow Medium Removal | 1Eh | M |
| Read (10) | 28h | M |
| Read (12) | A8h | M |
| Read CD-ROM Capacity | 25h | M |
| Read CD | BEh | M |
| Read CD MSF | B9h | M |
| Read Header | 44h | M |
| ⋮ | ⋮ | ⋮ |

*Conventional Art*

*Conventional Art*

*Conventional Art*

SERVO CONTROL METHOD USING INFORMATION OF A TABLE OF CONTENTS OF A DISK

BACKGROUND OF THE INVENTION

1. Field of the Invention

The present invention relates to a method for servo-controlling when a reproduction for non-real-time data or real-time data of audio or video stream is requested to a multi-session disk, and to a disk reproducing apparatus using the method.

2. Description of the Related Art

Shown in FIG. 1 is a general optical disk device connected to a host such as a personal computer, comprising an optical pickup 2 for detecting recorded signals from an optical disk 1, an R/F unit 3 for outputting binary signals and serve error signals TE and FE through combining signals reproduced from the optical disk 1 by the optical pickup 2, a digital signal processing unit 4 for processing the binary signals received from the R/F unit 3 to restore digital data, an interfacing unit 5 for transmitting the restored digital data to a host such as a personal computer, a sled motor 10 for moving the optical pickup 2 across tracks on the disk 1, a spindle motor 11 for rotating the optical disk 1, a driver 7 for driving the sled motor 10 and the spindle motor 11 to rotate, a servo unit 6 for providing control input to the driver 7 and the pickup 2, a microcomputer 8 for supervising overall operation of the servo unit 6 and the digital signal processing unit 4, and a memory 9 storing data for the microcomputer 8 to use for supervising operation.

When a data reproducing command is received from a connected personal computer through the interfacing unit 5 after the optical disk 1 is inserted into a disk tray, which is a part of the optical disk device mechanism, the optical disk 1 is clamped by a clamping means, and the optical disk device of FIG. 1 reads out recorded data after the following data-type-dependent servo-controlling operation.

There are two types of data request from a host as shown in FIG. 2. One is a 'play'0 command for requesting real-time data such as a audio stream, the other is 'read' command for non-real-time data. The operand codes are described in FIG. 2 for several commands belonging to the two types.

When the host connected to the optical disk device of FIG. 2 through the interfacing unit 5 sends a read-type or a play-type command, the optical disk device discriminates the type of a received command at first based on the operand code contained in the received command, then adjusts a reproduction speed based on the discriminated type.

FIG. 3 shows a flow example of a conventional data-type-dependent servo-controlling method, which is explained in detail.

If a read-type command requesting non-real-time data is received from the connected personal computer through the interfacing unit 5 (S10), the microcomputer 8 reads the operand code of the received command, interprets the received command as read-type for non-real-time data, sets parameter values for allowable high speed (S11) to the servo unit 6 to conduct high-speed reproduction.

If the received command is play-type, the microcomputer 8 identifies that the received command is requesting real-time data after reading its operand code, then sets values of servo parameters for low speed, for example 1X or 2X to conduct reproduction in real-time.

After setting parameters for low or high speed, the microcomputer 8 determines from the received command a target location in which the requested data are written (S12), then moves the pickup 2 to the position ahead of the target position by one or more data blocks (S13) in consideration of a possible miss in jumping to a physical track targeted by calculation of jump tracks. FIG. 4 shows such a jumping example.

In FIG. 4, the target position 'Tp' is located in a logical track #5 of a session #4, so that the pickup 2 jumps, under the control of the microcomputer 8, to a position 'Tp-N' ahead of the target position Tp by N blocks and reads data recorded along physical tracks from that position 'Tp-N'. The microcomputer 8 extracts sub-Q channel data from the read data (S14). The extracted sub-Q channel data consists of sync data of two bits S0 and S1, control data, address, data, and parity codes. The second most significant bit (MSB) b2 indicates whether a corresponding data block has real-time audio data or non-real-time data. Therefore, the microcomputer 8 reads the control bit b2 and identifies the type of data block (S15), which is positioned one or several blocks ahead of the target block, according to the current sub-Q channel data. If the read control bit b2 indicates that the data type is real-time audio, the microcomputer 8 considers the received read-type command to be inadequate, thus, sends a response informing mismatch of data type to the personal computer (S16). If the read control bit b2 indicates non-real-time data, the microcomputer 8 moves the reading point to the target position 'Tp' (S17) as maintains the current servo parameters set for high speed in the step S11. When the reading point is exactly on the target position 'Tp', the microcomputer 8 starts to transmit the data being reproduced at high speed to the personal computer (S18).

However, although the control bit b2 of the block ahead of the target position indicates real-time data, the block of the target location may be different in data type from the preceding block. Therefore, if preceding block is real-time data and the start target block is non-real-time data, the microcomputer 8 re-sets the values of servo parameters to increase speed abruptly and instantaneously, which causes excessive stress to a servo mechanism as well as a time delay of data reproduction. In addition, if the accessed sub-Q channel of the data block preceding the target position is partly damaged, the blocks after the target position are not even tried to read although their data can be reproduced normally.

SUMMARY OF THE INVENTION

It is an object of the present invention to provide a servo control method of an optical disk device being able to set a reproduction condition to be adequate to the type of data to reproduce in advance based on the information of table of contents (TOC) written in a lead-in area of a disk before jumping to a target location, when a data requesting command is received from a host such as a personal computer.

A servo-control method using the information of table of contents according to the present invention, reads information of a table of contents written in a disk when a data-requesting command is received from a connected host; distinguishes the type of data recorded in a target location based on the read information of the table of contents; checks whether the distinguished type is corresponding to the command type; and re-sets or maintains current parameters for servo-control operation if the distinguished type is matched to the received command, so that a servo-control mechanism is adjusted to the type of the requested data before a pickup starts to move to the target location.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 2 is a table of several commands belonging to 'play-type' and 'read-type' and their operand codes;

DETAILED DESCRIPTION OF THE PREFERRED EMBODIMENTS

In order that the present invention may be fully understood, preferred embodiment thereof will now be described with reference to the accompanying drawings.

Figure 1:
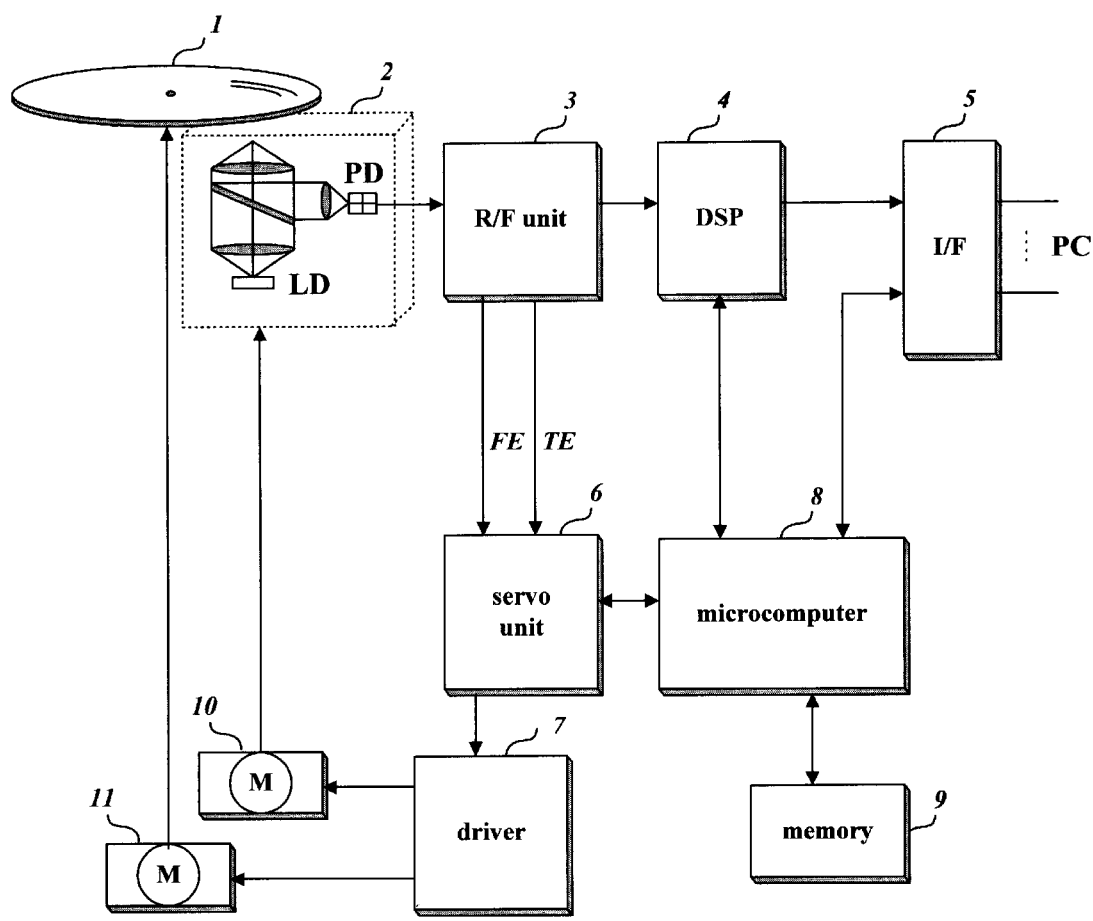
FIG. 1 is a block diagram of a general optical disk device connected to a host such as a personal computer.
Figure 3:
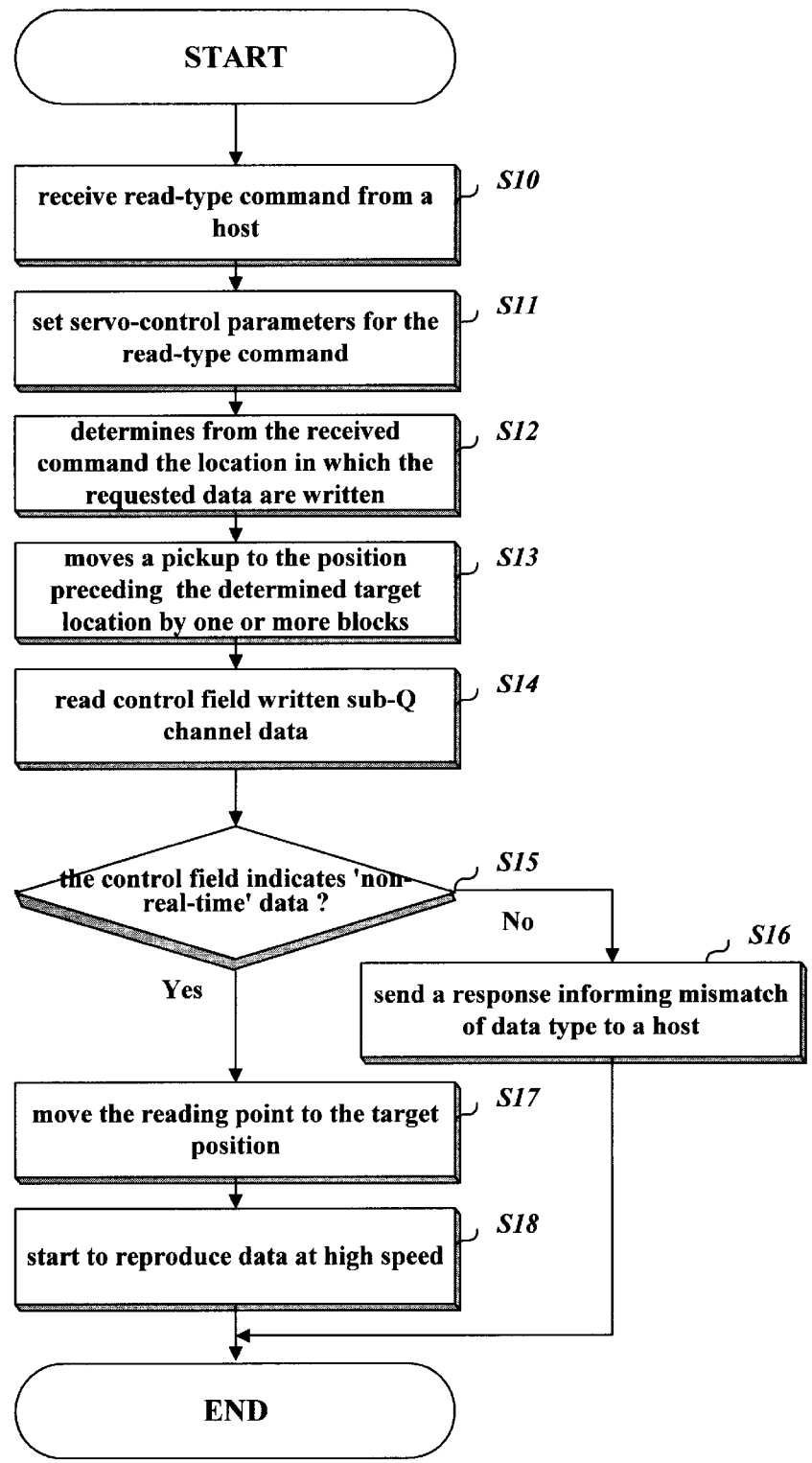
FIG. 3 shows a flow example of a conventional data-type-dependent servo-controlling method.
Figure 4:
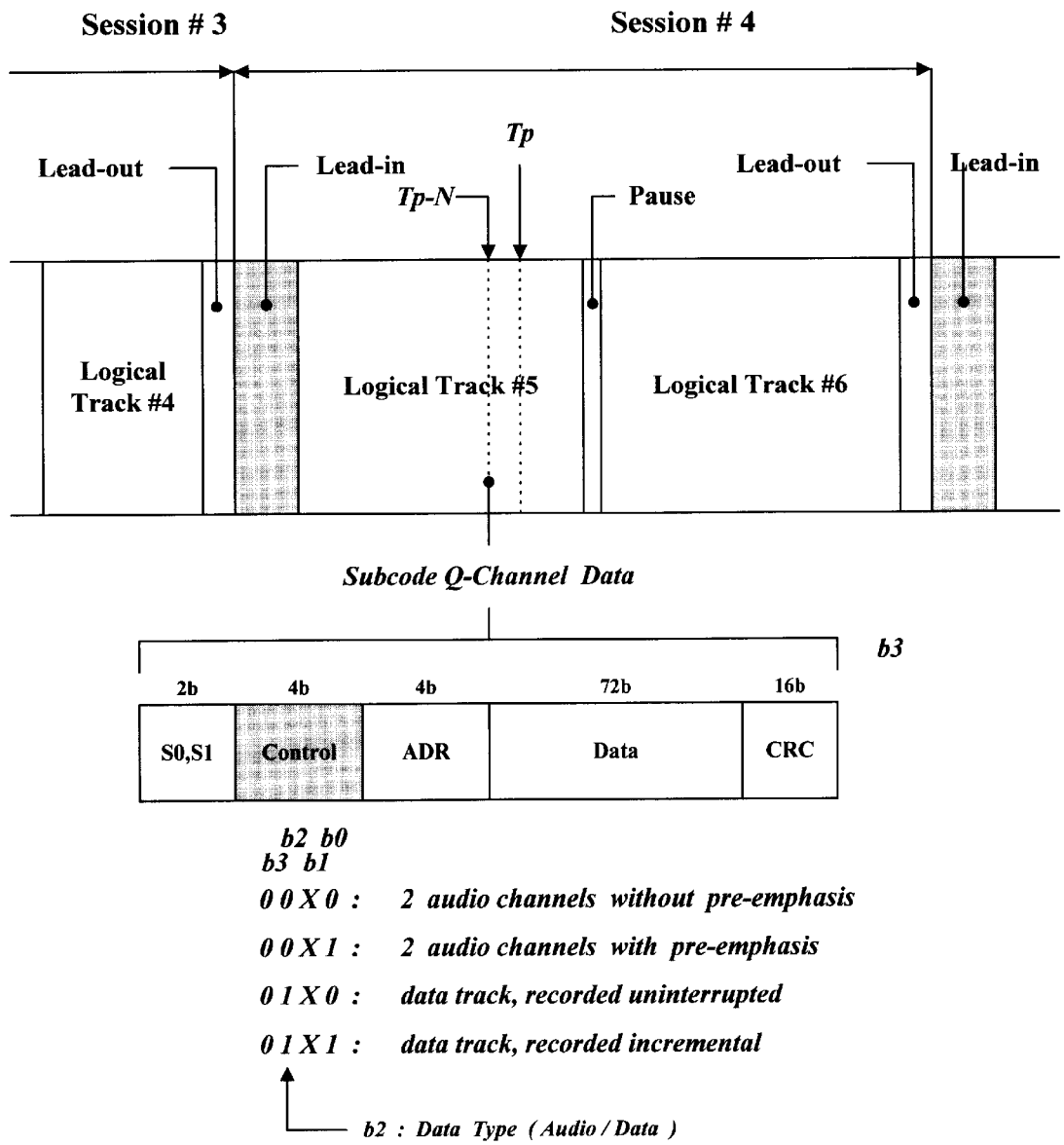
FIG. 4 shows a format example of recorded data and sub-Q channel format of each recorded data block.
Figure 5:
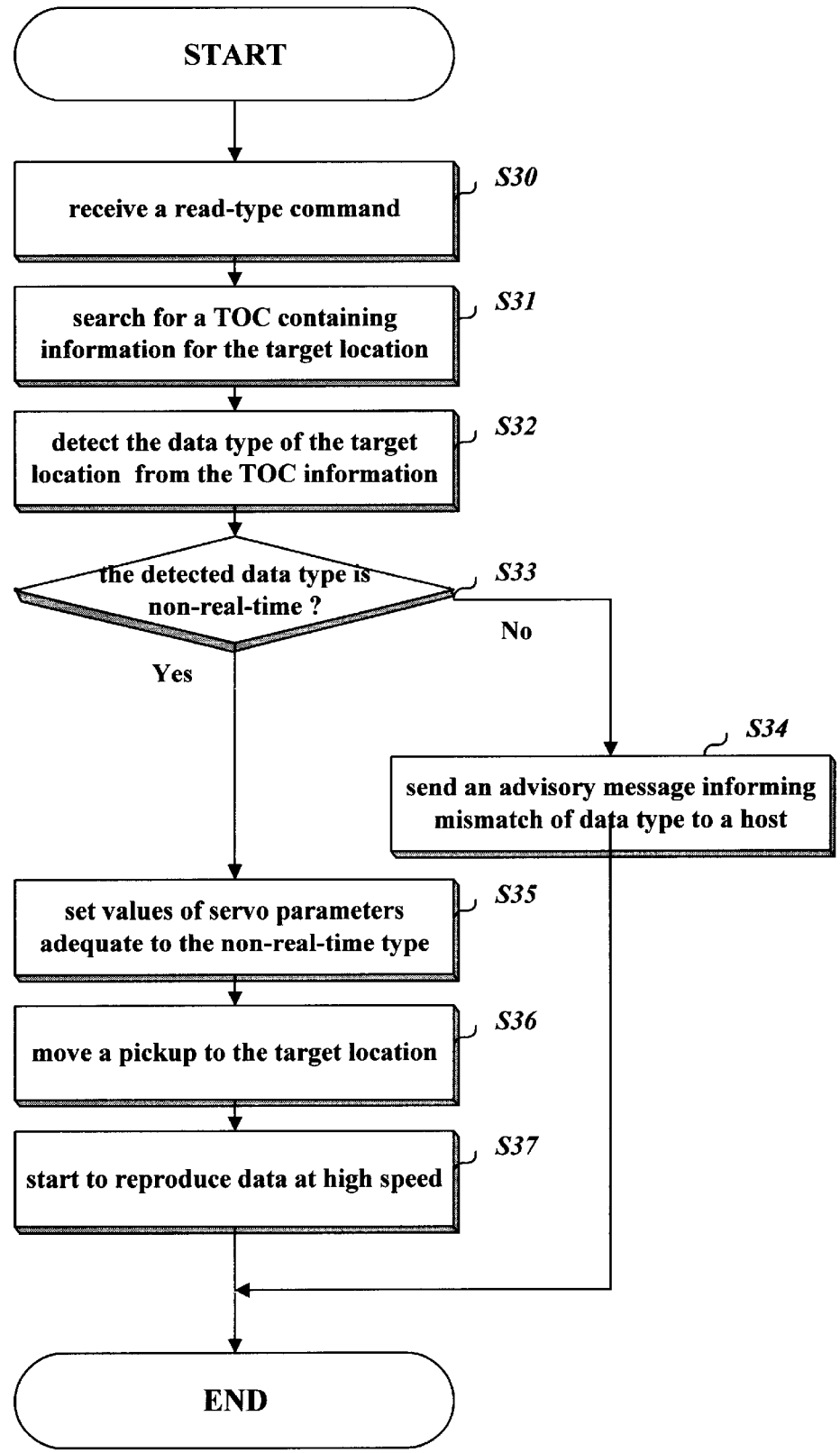
FIG. 5 is a flow example of a servo control method using the information of table of contents according to the present invention.

FIG. 5 is a flow example of a servo control method using the information of a table of contents (TOC) according to the present invention. The method of FIG. 5 is applicable to the device shown in FIG. 1.

When a data requesting command is delivered to the microcomputer 8 from a host such as a personal computer through the interfacing unit 5, the microcomputer 8 checks whether the received command is read-type for non-real-time data or play-type for real-time data and whether or not the data type matches with the command type after examining the information of a table of contents of an inserted disk 1.

The TOC located in a lead-in area of each session partitioned in a multi-session disk has been reproduced and then stored in the memory 9 or an internal memory of the microcomputer 8 through an initial disk-loading operation.

Figure 6:
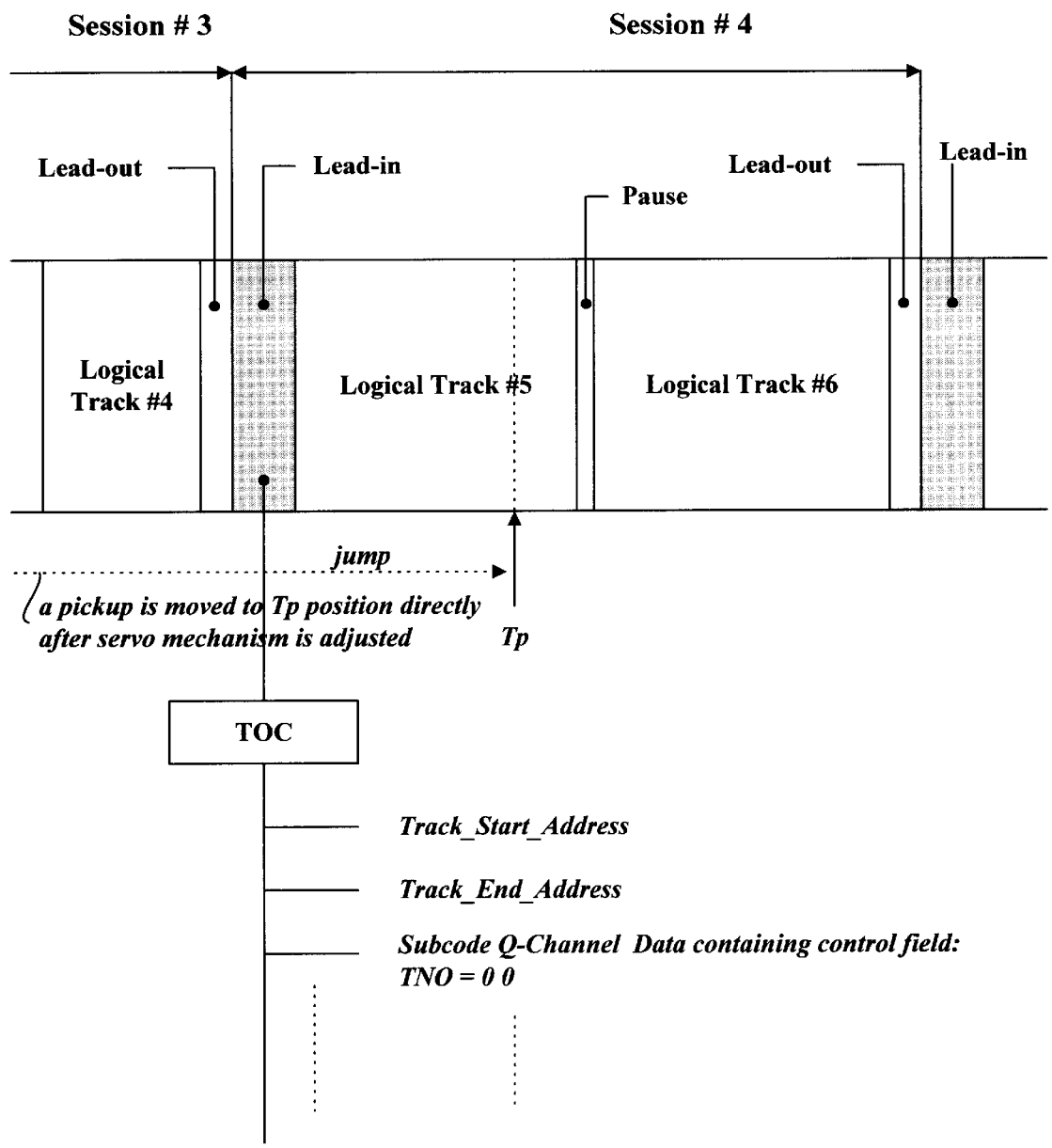
FIG. 6 depicts schematically the relation between logical tracks, lead-in and lead-out areas, and sessions.

FIG. 6 depicts logical tracks, lead-in and lead-out areas, and sessions schematically. The TOC located in each lead-in area contains information on start and end positions of all logical tracks besides same information that the above-explained sub-Q channel data of program area contains. Therefore, if the target location is obtained from the received command, the data type of target location can be detected before moving to the target location by using the start and end position information and control field information written in the table of contents.

When the data requesting command is received (S30), the microcomputer 8 extracts information regarding a target location from the command, and searches for a TOC which contains information for the target location (S31) as comparing target location information with position information of each logical track of each TOC whose data have been already retrieved into the memory 8 or the internal memory. After then, the microcomputer 8 detects the data type of the target location (S32) based on the bit b2 of the control field information written in the discovered TOC and compares the command type with the detected data type (S33).

For example, if the received command is a read-type command as shown in FIG. 5 and the detected type for the corresponding data block is real-time, that is audio, the microcomputer 8 sends a response informing mismatch of data type to the personal computer immediately (S34). If the two types match each other, that is, the data type for blocks belonging to target location is non-real-time, the microcomputer 8 sets values of servo parameters (S35) to be adequate to the non-real-time type requiring high-speed reproduction, and moves the pickup 2 to the target location 'Tp' (S36).

When the target position Tp is detected while moving the pickup 2 to the target location, at that time, the microcomputer 8 controls the digital signal processing unit 4 to start to restore digital data from binary signals being reproduced at high speed, and sends the restored data to the personal computer (S37).

If the received command is a play-type command requesting real-time data and the value of the control bit b2 corresponding to the target location specified in the play-type command is 1, which means that data of target location are real-time data, the microcomputer 8 sets values of servo parameters (S35) to be adequate to low-speed, for example 1X or 2X, and then moves the pickup 2 to the target location. When the pickup 2 is positioned just on the target track, low-speed data reproduction starts.

To be brief, the optical disk device explained above receives a data-requesting command from a host such as a personal computer, discriminates the type of the requested data based on the TOC information written in a lead-in area by detecting the data type of a target location using location information contained in the received command and TOC before moving to the target location, sets servo. parameters to be adequate to the type of the requested data if the two types of requested data and recorded data match each other, and, otherwise, sends an advisory message informing the data type mismatch to a host immediately without moving the pickup.

The servo-control method using the information of table of contents according to the present invention enables a servo-control operation to be adjusted stably based on the type of data to be reproduced, and makes a quick response to a host without conducting any servo-control operation when a type-mismatched command is received. In addition, although a data block preceding target data blocks has a damaged sub-Q channel data, the present method can reproduce the target data because it does not access the preceding data block.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A servo-control method of an optical disk device, comprising the steps of:

(a) distinguishing the type of data recorded in a target location based on information of the table of contents when a data-requesting command for the target location is received;

(b) checking whether the distinguished type is corresponding to the command type; and (c) re-setting current parameters for a servo-control operation based on the checked result.

2. The method set forth in claim 1, wherein said step (a) distinguishes the data type based on the value of the control field contained in sub-Q channel of the table of contents.

3. The method set forth in claim 1, wherein the parameters for a servo-control operation are to adjust a reproduction speed according to data type.

4. The method set forth in claim 1, wherein said step (a) comprises the steps of:

(a1) determining the target location based on the information contained in the received command;

(a2) identifying a table of contents containing management information on the determined target location; and (a3) discriminating the type of data written in the determined target location based on the identified table of contents.

5. A disk reproducing apparatus using information recorded on a disk for servo-control, comprising:

a receiver receiving data from a host;

a pickup reading data recorded on the disk;

a servo-controller servo-controlling a reproduction position of said pickup;

a data distinguishing unit distinguishing the type of data recorded in a target location based on information of the table of contents read by said pickup when a data-requesting command for the target location is received through said receiver;

a type checking unit checking whether the data type distinguished by said data distinguishing unit is corresponding to the command type; and a controller re-setting current servo parameters of said servo-controller based on the checked result from said type checking unit.

6. The apparatus set forth in claim 5, wherein said data distinguishing unit distinguishes the data type based on the value of the control field contained in sub-Q channel of the table of contents.

7. The apparatus set forth in claim 5, wherein the parameters to be set in said servo-controller are to adjust a reproduction speed according to data type.

8. The apparatus set forth in claim 5, wherein said data distinguishing unit determines the target location based on the information contained in the received command, identifies a table of contents containing management information on the determined target location, and discriminates the type of data written in the determined target location based on the identified table of contents.

* * * * *